(12) United States Patent
Lippok

(10) Patent No.: US 8,989,992 B2
(45) Date of Patent: Mar. 24, 2015

(54) METHOD AND SYSTEM FOR ESTIMATING PRESSURE IN A MOTOR VEHICLE

(75) Inventor: Lucian Lippok, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 784 days.

(21) Appl. No.: 12/826,588

(22) Filed: Jun. 29, 2010

(65) Prior Publication Data

US 2010/0332097 A1 Dec. 30, 2010

(30) Foreign Application Priority Data

Jun. 30, 2009 (DE) .......................... 10 2009 027 337

(51) Int. Cl.
*G06F 19/00* (2011.01)
*G06G 7/70* (2006.01)
*B60T 13/66* (2006.01)
*B60T 17/22* (2006.01)
*F02N 11/08* (2006.01)

(52) U.S. Cl.
CPC .............. *B60T 13/662* (2013.01); *B60T 17/22* (2013.01); *B60W 2510/0638* (2013.01); *B60W 2540/10* (2013.01); *B60W 2710/024* (2013.01); *F02N 11/084* (2013.01); *F02N 2200/0807* (2013.01); *Y02T 10/48* (2013.01)
USPC .......................................... 701/112; 701/113

(58) Field of Classification Search
USPC .................................................. 701/112, 113
See application file for complete search history.

(56) References Cited

U.S. PATENT DOCUMENTS

| | | | |
|---|---|---|---|
| 6,404,072 B2 * | 6/2002 | Onoyama et al. ........... | 290/40 C |
| 6,466,860 B2 * | 10/2002 | Kaneko ......................... | 701/112 |
| 2002/0074173 A1 * | 6/2002 | Morimoto et al. ........... | 180/65.2 |
| 2003/0004635 A1 * | 1/2003 | Kamiya et al. ................ | 701/112 |

* cited by examiner

*Primary Examiner* — Imran Mustafa
(74) *Attorney, Agent, or Firm* — Joseph E. Root

(57) ABSTRACT

Method for estimating the negative pressure in a motor vehicle brake force booster, and a stop/start control device is disclosed. One embodiment of the invention relates to a method for estimating the negative pressure in a motor vehicle brake force booster with reference to the hydraulic pressure in a brake master cylinder. According to the embodiment, the negative pressure is estimated solely on the basis of hydraulic pressure in the brake master cylinder and of the actual engine speed. One embodiment of the invention also relates to a stop/start control device for a motor vehicles.

4 Claims, 1 Drawing Sheet

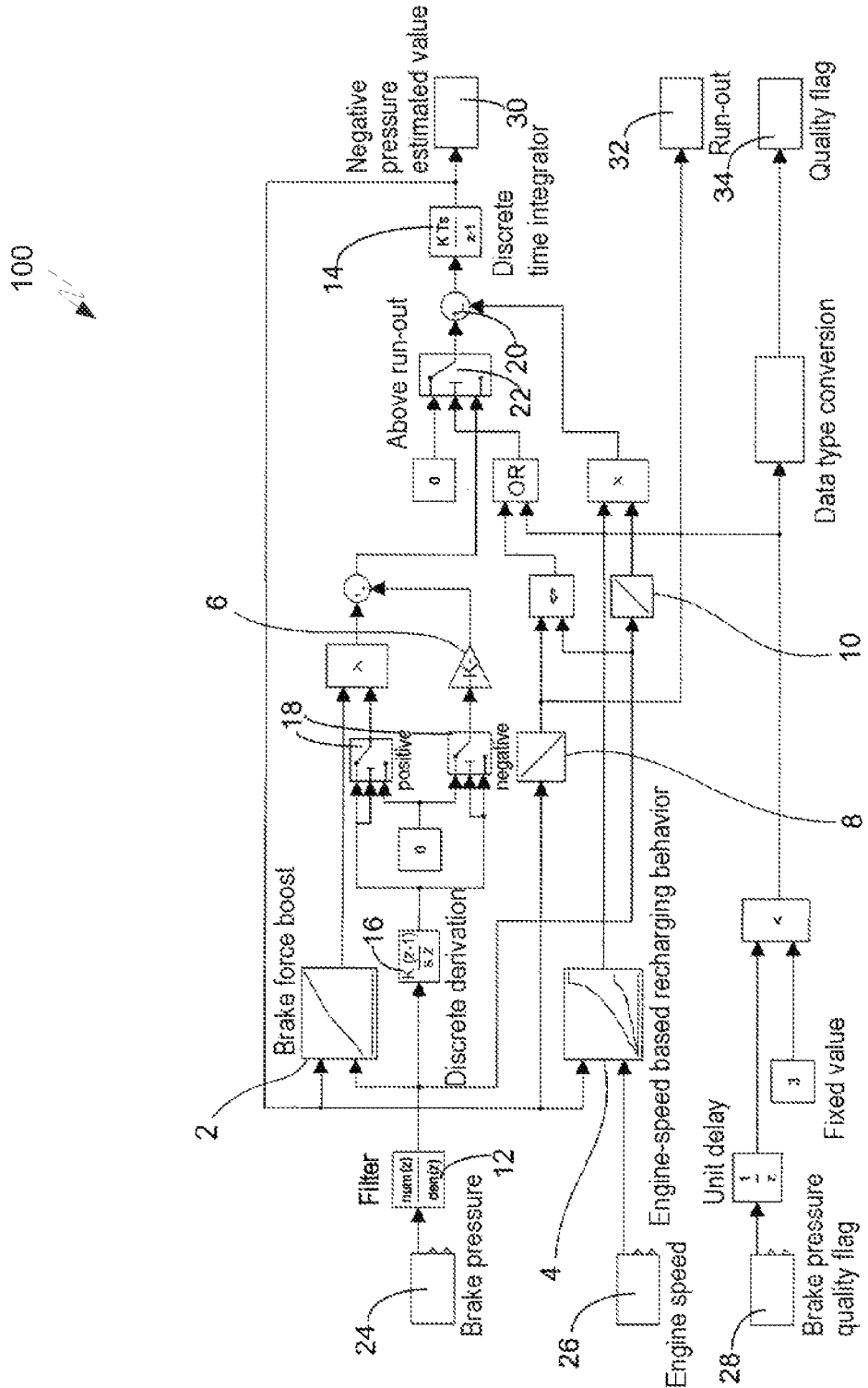

METHOD AND SYSTEM FOR ESTIMATING PRESSURE IN A MOTOR VEHICLE

BACKGROUND

The application relates generally to automotive vehicles, and more particularly to vehicles with automatic stop/start systems.

In motor vehicles with automatic stop/start systems, an internal combustion engine can be automatically stopped, i.e. switched off, when no propulsion power is required (for example, when waiting at a traffic light), and automatically restarted, i.e. using a starter, when the driver again requests propulsion power. Such stop/start operation reduces fuel consumption and noise emissions.

In motor vehicles with vacuum brake force boosters and automatic stop/start systems, the negative pressure prevailing in the brake force booster must be monitored in order to ensure that sufficient auxiliary braking force is always available. When the internal combustion engine is not running, no negative pressure is generated. If the driver operates the brake in this situation the negative pressure decreases rapidly to a value at which the auxiliary braking force is insufficient. This is undesirable, primarily for safety reasons.

To restart the internal combustion engine in a timely manner, a negative pressure sensor may be provided on the brake force booster and the actual negative pressure value may be compared to a threshold value. The internal combustion engine can be restarted when the negative pressure value falls below the threshold value. Such a sensor, however, leads to additional hardware cost and complexity.

Another simple alternative would be to count the actuations of the brake pedal and compare them to a threshold value. This solution may, however, be imprecise.

It would be highly desirable to have a precise and cost-effective method for estimating negative pressure in a motor vehicle brake force booster with reference to hydraulic pressure in a brake master cylinder.

SUMMARY

One embodiment of the present application describes a method for estimating negative pressure in a motor vehicle brake force booster with reference to hydraulic pressure in a brake master cylinder including estimating the negative pressure solely on the basis of the hydraulic pressure in the brake master cylinder and on the actual engine speed.

Another embodiment of the application describes a stop/start control device in a motor vehicle including an estimator to estimate negative pressure in the motor vehicle brake force booster solely on the basis of the hydraulic pressure in the brake master cylinder and on the actual engine speed. The control device further includes an actuating device to automatically restart an internal combustion engine in the motor vehicle in the event of insufficient negative pressure in the motor vehicle brake force booster.

BRIEF DESCRIPTION OF THE DRAWINGS

The FIGURE described below sets out and illustrates an exemplary embodiment of the disclosure. Throughout the drawing, like reference numerals refer to identical or functionally similar elements. The drawing is illustrative in nature and is not drawn to scale.

FIG. 1 shows a schematic diagram of a system for estimating negative pressure in a motor vehicle brake force booster with reference to brake pressure and actual engine speed.

DETAILED DESCRIPTION

The following detailed description is made with reference to the figures. Exemplary embodiments are described to illustrate the subject matter of the disclosure, not to limit its scope, which is defined by the appended claims.

In general, the present disclosure describes systems and methods for estimating negative pressure in a motor vehicle brake force booster with reference to hydraulic pressure in a brake master cylinder.

FIG. 1 shows a diagram of a system 100 for estimating negative pressure in a motor vehicle brake force booster with reference to brake pressure and actual engine speed. Input signals include hydraulic brake pressure 24 and the actual engine speed 26. In addition, a brake pressure quality flag 28 is also provided as input. Using the measured hydraulic brake pressure 24 and the measured engine speed 26, actual negative pressure loss rate and vacuum generation rate produced by engine-speed dependent pumping processes are estimated and integrated in an integrator 14 to generate an estimated negative pressure value 30.

For this purpose the actual value of the hydraulic pressure in a brake master cylinder of the motor vehicle is supplied to a function block 2 in which the actual value of the hydraulic pressure is converted, with reference to a stored look-up table, to a value corresponding to the current brake force boost (a measure of vacuum demand). In one embodiment, the table in the function block 2 is in two-dimensional form. The estimated negative pressure value 30 is entered in quasi back-coupled form in addition to the hydraulic pressure, for taking into account pressure-dependent effects of the brake force boosting.

The measured hydraulic brake pressure 24 is supplied beforehand to a filter section 12 for signal smoothing. A differentiating element 16 then determines the rate of change of the filtered hydraulic pressure value. The function blocks 18 determine whether the rate of change is positive or negative. If the rate of change is positive (that is, the brake pressure increases, indicating that the brake pedal is actuated), the rate of change is multiplied by a value obtained from the table at the function block 2 and supplied via an adder 20 to the integrator 14, where it is integrated.

If however, the rate of change is negative (that is, the brake pressure decreases, indicating that the brake pedal is released), the rate of change is multiplied in a block 6 by a constant negative factor K and the resulting value is supplied to the integrator 14 via the adder 20.

In addition, the actual engine speed 26 is supplied to a function block 4 in which the engine speed 26 is converted into a value corresponding to the engine-speed based recharging behavior of a vacuum pump of the brake system with reference to a stored look-up table.

In one exemplary embodiment, this look-up table in the function block 4 is also in two-dimensional form (like the brake force boost table at the function block 2), and it also takes account of the estimated negative pressure value 30, whereby, in particular, saturation effects are taken into account upon reaching a minimum pressure.

This value obtained from the table in the function block 4 is then modified in a multiplier, depending on the filtered hydraulic pressure value, according to a predefined characteristic curve 10.

The value thus obtained is supplied via the adder 20 to the integrator 14, with a sign inversion in relation to vacuum losses, so that the integrator 14 arrives at a balance for the negative pressure with reference to the positive and negative rates of change. The value of the integrator 14 is then provided as the estimated negative pressure value 30.

In addition, the run-out point of the brake force booster is considered. Run-out point refers to the point during brake pedal actuation from which no additional auxiliary braking force is available, and a further increase in pedal pressure is no longer boosted. In this state, the negative pressure demand (=zero) is lower, which is considered during estimation. In particular, upon establishing the run-out point, which is effected in a comparison block, the estimated decrease in negative pressure is set to zero in block 22. The instantaneous actual run-out point (pressure value) 32, which in the context of a higher-order control logic represents a separate criterion for the start/stop control system in addition to the estimated negative pressure value 30, is also provided as output.

As shown in FIG. 1, an estimated negative pressure value 30 in the brake force booster is obtained from the hydraulic brake pressure 24 and the engine speed 26.

In an exemplary embodiment, the brake pressure quality flag 28, which indicates the quality of the input signals, is also processed. For example, if the signal quality is inadequate because of a sensor fault, the negative pressure estimation is suppressed by the block 22. In addition, a corresponding quality flag 34 is transmitted to the higher-order control system.

If the vehicle does not have a separate vacuum pump (the vacuum being made available in the brake force booster via the negative pressure in the intake manifold), the signal of an intake manifold pressure sensor (normally already present) is preferably also evaluated, in order to obtain a measure for the restoration of the vacuum in the vacuum reservoir.

A brake pressure sensor is generally already present, for example in motor vehicles with ESP (electronic stability program), as is an electronic tachometer. The implementation of the embodiments of the present disclosure in such a motor vehicle therefore requires no additional hardware, but can be effected through software. The stoppage time of the internal combustion engine can therefore be optimized easily and the fuel consumption thereby minimized.

The specification has set out a number of specific exemplary embodiments, but those skilled in the art will understand that variations in these embodiments will naturally occur in the course of embodying the subject matter of the disclosure in specific implementations and environments. It will further be understood that such variation and others as well, fall within the scope of the disclosure. Neither those possible variations nor the specific examples set above are set out to limit the scope of the disclosure. Rather, the scope of claimed invention is defined solely by the claims set out below.

What is claimed is:

1. A method for estimating negative pressure in a motor vehicle brake force booster with reference to hydraulic pressure in a brake master cylinder, the method comprising:
   receiving signals corresponding to an actual hydraulic pressure in the brake master cylinder and an actual engine speed;
   processing the hydraulic pressure signal, including
      differentiating the hydraulic pressure signal to obtain a rate of change;
      obtaining a brake force boost value by converting the hydraulic pressure signal by a predetermined factor;
      upon identifying a positive rate of change, multiplying the hydraulic pressure signal by the boost value to obtain a resulting hydraulic pressure signal;
      upon identifying a negative rate of change, multiplying the hydraulic pressure signal by a predetermined factor to obtain a resulting hydraulic pressure signal;
   processing the engine speed signal, including
      converting the engine speed signal to a recharging behavior value by applying the engine speed signal to a lookup table; and
   estimating the negative pressure based solely on the resulting hydraulic pressure signal and the recharging behavior value;
   wherein the receiving and estimating are carried out in a controller operatively connected to the brake master cylinder.

2. The method for estimating negative pressure in a motor vehicle brake force booster of claim 1, wherein converting the engine speed signal to a recharging behavior value by applying the engine speed signal to a lookup table is accomplished supplying an actual engine speed signal to a function block in which the engine speed signal is converted into a value corresponding to the engine-speed based recharging behavior of a vacuum pump of the brake system with reference to a stored look-up table.

3. A stop/start control device in a motor vehicle comprising:
   an estimator configured for
      receiving signals corresponding to an actual hydraulic pressure in the brake master cylinder and an actual engine speed;
      processing the hydraulic pressure signal, including
         differentiating the hydraulic pressure signal to obtain a rate of change;
         obtaining a brake force boost value by converting the hydraulic pressure signal by a predetermined factor;
         upon identifying a positive rate of change, multiplying the hydraulic pressure signal by the boost value to obtain a resulting hydraulic pressure signal;
         upon identifying a negative rate of change, multiplying the hydraulic pressure signal by a predetermined factor to obtain a resulting hydraulic pressure signal;
      processing the engine speed signal, including
         converting the engine speed signal to a recharging behavior value by applying the engine speed signal to a lookup table;
      estimating the negative pressure based solely on the resulting hydraulic pressure signal and the recharging behavior value; and
      determining whether the estimated negative pressure is insufficient for braking purposes; and
   an actuating device configured to automatically restart an internal combustion engine in the motor vehicle in the event the estimated brake pressure is insufficient.

4. The stop/start control device of claim 3, wherein converting the engine speed signal to a recharging behavior value by applying the engine speed signal to a lookup table is accomplished supplying an actual engine speed signal to a function block in which the engine speed signal is converted into a value corresponding to the engine-speed based recharging behavior of a vacuum pump of the brake system with reference to a stored look-up table.

* * * * *